J. S. Upton,
Horse Power.
No 1,206. Reissued July 2, 1861.
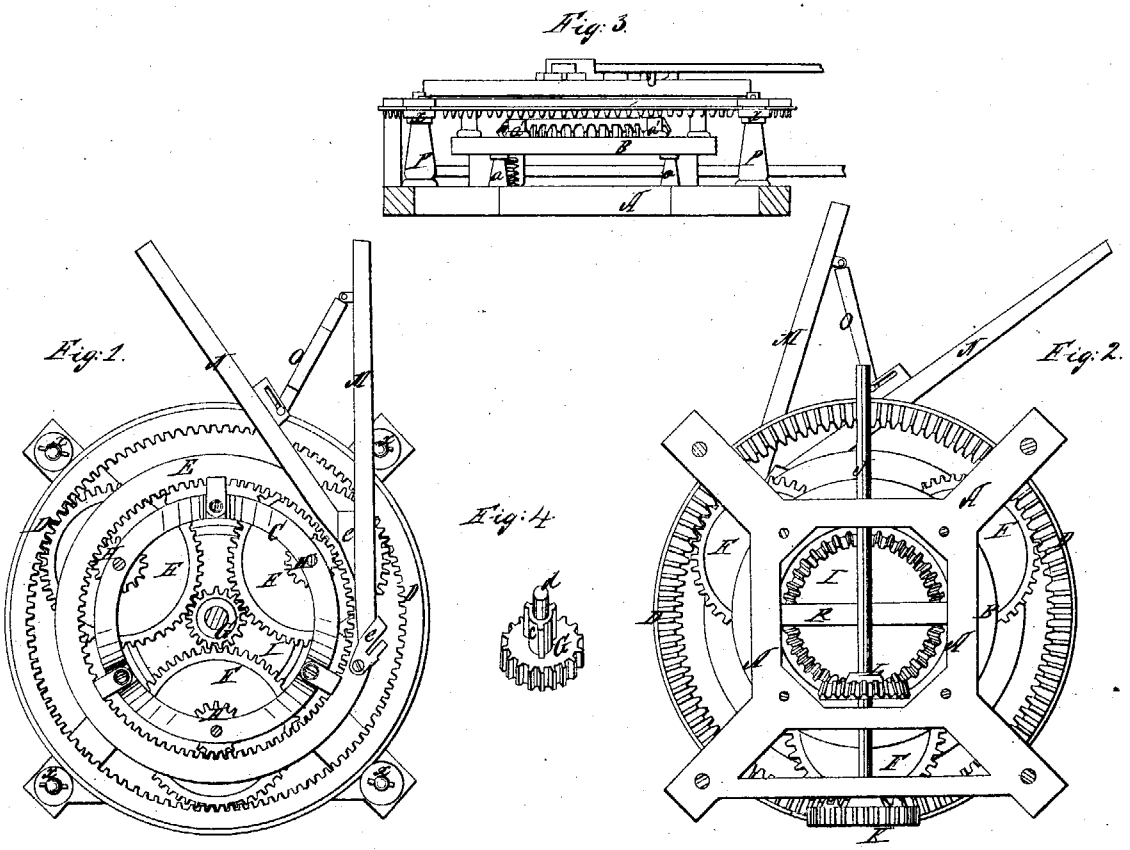
Witnesses:
C M Alexander
A. A. Seatman
Inventor.
J. S. Upton
A.M. PHOTO-LITHO. CO. N.Y. (OSBORNE'S PROCESS)

UNITED STATES PATENT OFFICE.

JAMES S. UPTON, OF BATTLE CREEK, MICHIGAN.

IMPROVED HORSE-POWER.

Specification forming part of Letters Patent No. 338, dated February 5, 1861; Reissue No. 1,206, dated July 2, 1861.

*To all whom it may concern:*

Be it known that I, JAMES S. UPTON, of Battle Creek, in the county of Calhoun and State of Michigan, have invented certain new and useful Improvements in Horse-Powers; and I do hereby declare that the following is a full, clear, and exact decription of the same, reference being had to the accompanying drawings, and to the letters of reference marked thereon.

The nature of my invention consists in constructing, arranging, and using the several parts of this machine in the manner hereinafter described.

In the annexed drawings, Figure 1 is a plan view. Fig. 2 is a bottom view. Fg. 3 is a side elevation. Fig. 4 is a perspective of the internal gear-wheel.

In the figures, A represents the frame upon which the gearing of the power is secured. Above this frame are two annular rims, B and C, which are supported upon standards *a a* and *a′ a′*. Across the rim B is secured a piece, R, as shown in Fig. 2.

I represents a wheel which has bevel-gear upon its under side, and which is situated about the center of the frame.

G represents an internal gear-wheel, with a shaft, *d*, and with a collar, *c*, provided with flanges, as seen, which rests upon the wheel I. The flanges of the collar *c* fit in grooves cut through the wheel I, so that the two wheels are secured together, and the shaft *d*, resting in and upon the cross-piece R, serves as a shaft for both wheels to revolve upon.

F F F represent three gear-wheels, whcih stand around the center pinion or internal gear-wheel, G.

H H H are three pinions which rest upon the three wheels F, and which are secured to them in the same manner that wheel G is secured to wheel I. The shafts which pass through pinion H and wheels F have their upper bearing in the rim C and their lower bearing in the rim B.

E represents a rim-wheel, with internal gear, into which the teeth upon the pinions H catch, as shown in Fig. 1.

D represents a rim-wheel also, which is provided both with internal gear and gear upon its under side. The outer circumference of this wheel D is provided with a flange at its center, which works in grooves in the rollers *x x*, situated upon the standards P P.

*e e* represent shoes, which are attached to the wheel E, as shown in Fig. 1. These shoes contain and secure the inner ends of the levers M N. The levers M N are secured or connected together by means of a bar, O, one end of which is hinged to lever M, the other being held in a box attached to lever N. Notches are cut in the bottom of the box which contains the end of the bar O, so that it may be adjusted to tighten the levers when necessary.

J is a shaft on the frame A, beneath the gearing above described, which is provided with two gear-wheels, K and L. The wheel K is intended to gear into the under side of the wheel D, and the wheel L is intended to gear into wheel I. These wheels K and L are not intended to gear into the wheels D and I at the same time, and hence the shaft J is so arranged that it will adjust endwise, allowing only one of the wheels K and L to be in gear at one time. When I wish great speed, I throw the wheel K in gear with the wheel D; but when I want more power and less speed I throw wheel L in gear with wheel I, thus changing the speed and power of the machine as may be desirable.

Having thus fully described my invention, what I claim as new, and desire to secure by Letters Patent, is—

1. The employment of the center-pinion G, when provided with a flanged collar, *c*, which fits into a corresponding opening in the bevel-wheel I, by means of which a firm and at the same time an easily-separated connection is formed between the wheels, as is set forth.

2. The combination of the pinion G with the wheels I and L and shaft J; also, the combination of shaft J with wheels D and K, so that I may use more power and less speed, or the converse, substantially as specified.

3. The arrangement of the shoe *e*, the levers M and N, and the connecting-bar O, when the same are constructed and used in the manner and for the purpose herein set forth.

In witness that I claim the foregoing I have hereunto set my hand in the presence of witnesses.

JAMES S. UPTON.

Witnesses:
C. M. ALEXANDER,
M. M. DOW.